United States Patent [19]

Gusik

[11] Patent Number: 5,453,234
[45] Date of Patent: Sep. 26, 1995

[54] PROCESS FOR MOULDING ULTRA-HIGH MOLECULAR WEIGHT POLYETHYLENE POWDER

[75] Inventor: Meinhard Gusik, Oberhausen, Germany

[73] Assignee: Hoechst Aktiengesellschaft, Germany

[21] Appl. No.: 142,603

[22] Filed: Oct. 25, 1993

[30] Foreign Application Priority Data

Dec. 11, 1992 [DE] Germany ............... 42 41 757.1

[51] Int. Cl.⁶ ................................ B29C 43/04
[52] U.S. Cl. ................ 264/120; 264/126; 264/319
[58] Field of Search ................... 264/126, 237, 264/120, 125, 319

[56] References Cited

U.S. PATENT DOCUMENTS

| | | |
|---|---|---|
| 3,975,481 | 8/1976 | Baumgaertner ............ 264/126 |
| 4,110,391 | 8/1978 | Berzen et al. ............ 264/120 |
| 4,171,338 | 10/1979 | Mason ............ 264/236 |
| 4,351,869 | 9/1982 | Cresap ............ 264/314 |
| 4,460,530 | 7/1984 | Hanson et al. ............ 264/121 |
| 4,725,151 | 2/1988 | Orndorff, Jr. ............ 384/98 |
| 4,880,843 | 11/1989 | Stein ............ 264/126 |
| 4,925,880 | 5/1990 | Stein ............ 264/126 |
| 5,032,338 | 7/1991 | Weedon et al. ............ 264/237 |
| 5,106,558 | 4/1992 | Kobayashi et al. ............ 264/120 |

*Primary Examiner*—Allan R. Kuhns
*Attorney, Agent, or Firm*—Jordan B. Bierman; Bierman and Muserlian

[57] ABSTRACT

Moldings of ultra high molecular weight polyethylene powder are produced by heating the polymer powder at 160° to 280° C. in a mold without applying pressure or at a pressure of up to 0.5 MPa, and then cooling it to room temperature at a pressure of from 4 to 20 MPa.

5 Claims, No Drawings

5,453,234

PROCESS FOR MOULDING ULTRA-HIGH MOLECULAR WEIGHT POLYETHYLENE POWDER

STATE OF THE ART

Ultra high molecular weight polyethylene (UHMWPE) is taken to mean linear polyethylenes produced by a low pressure process and having viscometrically measured average molecular weights of at least $1\times10^6$ g/mol, preferably from $2.5\times10^6$ g/mol to more than $1\times10^7$ g/mol. The procedure for determining the abovementioned molecular weights is described, for example, in CZ-Chemische Technik, Vol. 4 (1974), 129 ff.

UHMWPE has a special position among polyethylenes as it has a number of physical properties which make many applications possible. Worthy of particular mention are its high abrasion resistance, its low coefficient of friction and its exceptional toughness. It is furthermore markedly resistant to numerous chemicals. Because of its favorable mechanical, thermal and chemical properties, UHMWPE has found use in various fields as a high-value special material. Examples are the textile industry, mechanical engineering, the chemical industry and mining.

Yet the scope for using ultra high molecular weight polyethylene is limited by the difficulties in its processing. This is because, unlike the low molecular weight types of polyethylene, the high molecular weight products can only be processed using presses and screw or ram extruders because of their extremely high melt viscosity. Pressing and extrusion often give only partly formed pieces from which parts of the desired shape must be produced by machining off material.

A process for producing solid objects from UHMWPE is described in DE-A-2A 25 396 which starts from pulverulent material, the particles of which have an average particle size of less than 100 μm with a distribution function (which can be determined from the particle count for a number of particle size intervals) of less than 0.8. The powder is pressed to give a solid preform at a pressure of at least 140 kg/cm$^2$ at a temperature below the crystalline melting point of the polyethylene. After releasing the pressure, the preform is sintered at a temperature above the crystalline melting point. Since the as-synthesized ultra high molecular weight polyethylene usually contains particles larger than 100 μm, this procedure requires comminution of the starting material by appropriate means, for example by milling. An additional disadvantage of the known procedure is that the moldings are not homogeneously plasticated throughout. They can therefore expand during the sintering process as a function of the temperature applied. This phenomenon can be attributed to the preform being sintered outside the pressing mold. As a consequence, the physical properties are not reproducible and vary greatly. Strict dimensional accuracy of the moldings is furthermore not ensured.

Another process for producing moldings from pulverulent polyolefins having molecular weights of at least 1 million is taught in DE-C-26 34 537 wherein the pulverulent polymers are converted into the rubber-elastic state at from 150° to 250° C., preferably from 190° to 210° C., in a mold loosely closed by a punch. The material is then immediately densified in the mold at pressures of from 2.5 to 25 N/mm$^2$ in a first stage of at least 32 minutes, then at pressures of from 40 to 100 N/mm$^2$ in a second stage of at least 1 minute and the molding is then allowed to cool in the mold without pressure being applied. This process has proved successful in practice, but only makes possible the production of moldings having a simple geometry.

OBJECTS OF THE INVENTION

It is an object of the invention to provide a process for the molding of complex-shaped moldings from ultra high molecular weight polyethylene powder free of the disadvantages of the prior art.

It is another object of the invention to provide novel moldings which are completely homogeneous and have uniform physical properties throughout the molding.

These and other objects and advantages of the invention will become obvious from the following detailed description.

DETAILED DESCRIPTION OF THE INVENTION

The novel process of the invention for producing moldings from pulverulent ultra high molecular weight polyethylene comprises heating said polymer powder to 160° to 280° C. in a mold loosely closed by a punch in a press without applying pressure or at a pressure of up to 0.5 MPa, and then cooling it to room temperature at a pressure of from 4 to 20 MPa.

The novel process allows the production from UHMWPE of moldings having varying and even demanding geometries having high homogeneity and dimensional accuracy.

The starting material can be any type of pulverulent ultra high molecular weight polyethylene, regardless of how they were produced. It is possible to use polymers obtained by the Ziegler process by polymerization of ethylene in the presence of transition metals of the 4th to 6th group of the Periodic Table of the elements together with organometallic compounds of the elements of the 1st to 3rd group of the Periodic Table of the elements. It is, however, also possible to use ultra high molecular weight polyethylenes which have been produced from anhydrous and oxygen-free ethylene in the gas phase in the presence of supported catalysts containing chromium oxide and metal alkyl. It is particularly remarkable that the polymers can be used with the particle size obtained in the synthesis. The average particle size is, depending on the polymerization process, about from 100 to 400 μm, but may also be smaller or larger.

The process of the invention can be carried out in a simple manner. The pulverulent polymer is introduced into a mold of any desired shape which is loosely closed by a fitting but not airtight punch lying on top. In this process stage, the punch applies only a slight pressure (contact pressure) of up to 0.5 MPa to the powder. The powder in the mold is then heated to a temperature of 160° to 280° C., preferably 220° to 250° C., which procedure can be carried out directly in the press, heat being conducted from the upper and lower platens. A heatable mold can, however, also be used. Finally, it is possible to carry out the heating in a special facility, for example in an electric oven.

Owing to the poor thermal conduction, a temperature gradient is established in the powder bed with the result that the temperature decreases from the outside layers into the middle of the mold. To avoid inhomogeneities in the final pressed product, care must be taken that temperatures in all parts of the powder bed are within the abovementioned ranges. Overheating, even in limited regions, must be avoided so that the material is not thermally damaged.

Oxidative damage to the heated UHMWPE can be combated by maintenance of an inert gas atmosphere, for example nitrogen. The duration of heating is dependent on the powder volume and on the geometry of the molding. During heating, the ultra high molecular weight polyethylene which possesses not an actual melting point but a crystalline melting range (about 130° to 135° C.) becomes viscoelastic. The weight of the loosely overlying punch leads to a minor densification of the powder, and to substantial degassing of the material.

As soon as the processing temperature of 160° to 280° C., preferably 220° to 250° C., has been reached, the polymer in the mold is placed under a pressure of from 4 to 20 MPa, preferably 8 to 14 MPa. The pressure to be used depends particularly on the amount of polymer to be processed and on the geometry of the molding. Higher pressures should be used for large amounts of polymer and for shapes which are composed of regions of widely differing wall thicknesses.

The processing temperature is maintained until the punch reaches its final position in the mold at constant pressure which stage is generally attained within from 1 to 5 minutes. The molding is then cooled to room temperature while maintaining the pressure. Cooling may occur by heat exchange with the surrounding atmosphere and can be accelerated by use of coolants in the upper and lower platens or in the mold. The cooling time depends on the size of the molding and on the type of the heat exchange.

In each phase of the process prior to the cooling under pressure, it is possible to add more pulverulent UHMWPE to the mold, if the amount of material needed for production of the desired molding has to be supplemented during the process. Account must here be taken of the fact that the bulk volume of the polyethylene powder is from about 2 to 2.5 times as great as the volume of the molding manufactured from it. The newly added powder must, of course, be subjected to the same thermal and pressure treatment as that originally used. It is, however, more advantageous to provide the mold with an upstream chamber from which further polymer powder can be continuously fed in such quantity as is necessary to fill the mold, and to calculate the stroke so that the powder can be densified in one operation. The cooled body is completely plasticated and free of voids and can easily be removed from the mold.

The process of the invention makes possible the production of dimensionally accurate moldings from ultra high molecular weight polyethylene by pressing. No wasteful machining to remove material is necessary. The pressurization of the plasticated bodies takes only a short time so that press capacity can be effectively used. The pressurization can furthermore be carried out at room temperature after the heating stage, so that way it consumes little energy.

The novel procedure ensures a high production rate by use of multi-die presses or of automatic processing methods and is suitable for manufacturing moldings of any desired shape. Complex-shaped machine parts such as pump housings, pump rotors and valve components, for example for chemical apparatus, can be produced in high quality. It is, however, also possible to manufacture sheets of UHMWPE having a thickness of about 10 mm and less, which could previously only be obtained by splitting polyolefin blocks.

Various modifications of the process and products of the invention may be made without departing from the spirit or scope thereof and it should be understood that the invention is intended to be limited only as defined in the appended claims.

What is claimed is:

1. A process for producing moldings from pulverulent ultra high molecular weight polyethylene comprising heating said polyethylene to a heating temperature of 160° to 280° C. in a mold loosely closed by a punch in a press at a heating pressure of up to 0.5 MPa, and then cooling said polyethylene to room temperature at a cooling pressure of 4 to 20 MPa, said heating temperature and said heating pressure being maintained throughout said heating.

2. The process of claim 1 wherein said heating temperature is 220° to 250° C.

3. The process of claim 1 wherein the heating is carried out under an inert gas atmosphere.

4. The process of claim 2 wherein the heating is carried out under an inert gas atmosphere.

5. The process of claim 1 wherein the polymer is cooled in the press at a pressure of from 8 to 14 MPa.

* * * * *